(12) United States Patent
Jungwirth

(10) Patent No.: US 9,921,297 B2
(45) Date of Patent: Mar. 20, 2018

(54) RANGE ENHANCEMENT FOR LIDAR SYSTEM AND IR CAMERA SYSTEMS

(71) Applicant: The Boeing Company, Huntington Beach, CA (US)

(72) Inventor: Doug R Jungwirth, Northridge, CA (US)

(73) Assignee: THE BOEING COMPANY, Chicago, IL (US)

( * ) Notice: Subject to any disclaimer, the term of this patent is extended or adjusted under 35 U.S.C. 154(b) by 596 days.

(21) Appl. No.: 14/552,206

(22) Filed: Nov. 24, 2014

(65) Prior Publication Data

US 2016/0146926 A1    May 26, 2016

(51) Int. Cl.
*G01S 7/48* (2006.01)
*G01S 17/08* (2006.01)
*G01S 7/481* (2006.01)
*G02B 5/12* (2006.01)

(52) U.S. Cl.
CPC ............ *G01S 7/4804* (2013.01); *G01S 7/48* (2013.01); *G01S 7/4813* (2013.01); *G01S 17/08* (2013.01); *G02B 5/12* (2013.01)

(58) Field of Classification Search
CPC .......... G01C 15/00; G02B 5/122; G02B 5/12
See application file for complete search history.

(56) References Cited

U.S. PATENT DOCUMENTS

| | | | |
|---|---|---|---|
| 6,157,486 A | 12/2000 | Benson, Jr. et al. | |
| 6,324,024 B1 * | 11/2001 | Shirai | G01C 15/002 356/4.01 |
| 7,515,257 B1 * | 4/2009 | Roe | B64G 1/646 356/139.03 |
| 2007/0052951 A1 * | 3/2007 | Van Cranenbroeck | G01C 15/002 356/139.03 |
| 2011/0128625 A1 * | 6/2011 | Larsen | B82Y 20/00 359/530 |

OTHER PUBLICATIONS

European Patent Office; Extended European Search Report dated Aug. 24, 2016 issued in European Patent Application No. EP15187520.0.
European Patent Office; Partial European Search Report issued in European Patent Application No. 15187520; dated Apr. 22, 2016.

* cited by examiner

*Primary Examiner* — Luke D Ratcliffe
(74) *Attorney, Agent, or Firm* — Parsons Behle & Latimer

(57) ABSTRACT

A system includes a light detection and ranging (LIDAR) device. The system further includes a LIDAR target. The LIDAR device is configured to direct a light beam at the LIDAR target. The system also includes a retro-reflective material in contact with the LIDAR target.

19 Claims, 5 Drawing Sheets

RANGE ENHANCEMENT FOR LIDAR SYSTEM AND IR CAMERA SYSTEMS

FIELD OF THE DISCLOSURE

The present disclosure generally relates to range enhancement for light detection and ranging (LIDAR) systems and infrared (IR) camera systems.

BACKGROUND

A light detection and ranging (LIDAR) system directs an incident light beam at a target and detects a reflected light beam. The distance to the target may be calculated based on a time of flight measurement of the incident light beam and the reflected light beam. Similarly, an infrared (IR) camera system directs an IR light beam at a target and detects a reflected IR light beam. The IR camera system may generate an image based on the reflected IR light beam.

Current LIDAR systems and IR camera systems have limited ranges due to scattering of incident light beams and reflected light beams within target areas and due to unknowns regarding target materials. For example, a target area may have a scattering coefficient of 3% to 10% with scattering angles of up to 4 pi steradians thereby significantly reducing the amount of light reflected back to the LIDAR system or IR camera system by a factor of the distance squared. Further, only a small portion of the incident light beams may be reflected back to the LIDAR systems or IR cameras because targets are often made of unknown materials that are not designed to reflect light.

Because of these effects, the amount of reflected light received by a LIDAR system or IR camera system decreases as the flight time of the light increases. Thus, an amount of time during which a LIDAR searches for the reflected light beam may be limited because the longer the LIDAR searches, the weaker the reflected light becomes, and the more likely it becomes that a stray light beam will be confused with a reflected light beam. Thus, current LIDAR systems and IR camera systems become more subject to interference from stray light beams as a distance to a target increases. Other limitations of current LIDAR systems and current IR camera systems may be known to persons of ordinary skill in the relevant art.

SUMMARY

Disclosed are systems and methods that resolve or mitigate the above-noted, and other, deficiencies and drawbacks of existing systems.

In an embodiment, a system includes a light detection and ranging (LIDAR) device. The system further includes a LIDAR target. The LIDAR device is configured to direct a light beam at the LIDAR target. The system also includes a retro-reflective material in contact with the LIDAR target.

In an embodiment, the retro-reflective material is retro-reflective of light within a first wavelength range and is non-retro-reflective of light within a second wavelength range. The first wavelength range may include infrared light and the second wavelength range may include visible light. Alternatively, the first wavelength range may include a first infrared range and the second wavelength range may include a second infrared range.

In an embodiment, the retro-reflective material includes a retro-reflective dust configured to be dusted off of the LIDAR target over a period of time. Alternatively, the retro-reflective material may include a retro-reflective paint, a retro-reflective coating, a retro-reflective tape, a retro-reflective cloth, a retro-reflective surface finish, or a combination thereof.

In an embodiment, the retro-reflective material includes a retro-reflective structure configured to receive an incident electromagnetic beam from the LIDAR device and to reflect the incident electromagnetic beam back to the LIDAR device as a reflected electromagnetic beam. A divergence angle of the reflected electromagnetic beam may be substantially equal to a divergence angle of the incident electromagnetic beam. The retro-reflective structure may include a corner cube or a retro-reflecting ball. The retro-reflective structure may further include a filter that substantially passes light within a first wavelength range and substantially blocks light within a second wavelength range. A distance between the LIDAR device and the LIDAR target may be greater than 20 feet.

In an embodiment, a system includes an infrared (IR) source. The system further includes an IR camera. The system also includes an IR target. The system includes a retro-reflective material in contact with the IR target.

In an embodiment, the system further includes a processor configured to receive an IR image from the IR camera and to detect and track the IR target based on the IR image. In another embodiment, the IR target may include one or more surfaces. The system may further include a processor configured to receive an IR image from the IR camera and to detect and track a shadow target positioned between the IR camera and the one or more surfaces.

In an embodiment, the system also includes a second IR camera and a processor configured to calculate parallax measurements based on information received from the IR camera and from the second IR camera. The processor may further be configured to calculate a distance from a fixed point to the IR target based on the parallax measurements.

In an embodiment, the system further includes a second IR target. The system may include a second retro-reflective material in contact with the second IR target. The retro-reflective material may be retro-reflective of light within a first wavelength range and may be non-retro-reflective of light within a second wavelength range. The second retro-reflective material may be non-retro-reflective of light within the first wavelength range and may be retro-reflective of light within the second wavelength range.

In an embodiment, a method includes receiving, at a retro-reflective material, an incident electromagnetic beam from an electromagnetic source. The method further includes filtering the incident electromagnetic beam, at the retro-reflective material, to substantially pass light within a first wavelength range and to substantially block light within a second wavelength range. The method also includes retro-reflecting the incident electromagnetic beam from the retro-reflective material back to the electromagnetic source as a reflected electromagnetic beam.

In an embodiment, the method includes lining a surface of a target with the retro-reflective material. The method may further include receiving the reflected electromagnetic beam at the electromagnetic source and determining a distance between the electromagnetic source and the target based on a measured time of flight of the incident electromagnetic beam and the reflected electromagnetic beam. The method may include receiving the reflected electromagnetic beam at the electromagnetic source and tracking the target in two dimensions via the reflected electromagnetic beam.

Figure 1:
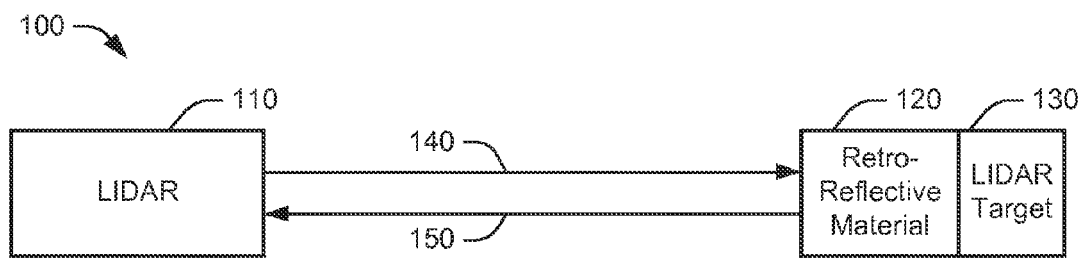
FIG. 1 illustrates an embodiment of a range enhanced system for light detection and ranging (LIDAR)

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Referring to FIG. 1, an embodiment of a range enhanced system for light detection and ranging (LIDAR) is depicted and generally designated as 100. The system 100 includes a LIDAR device 110, a retro-reflective material 120, and a LIDAR target 130. The LIDAR device 110 may be configured to determine a distance between a fixed point and the LIDAR target 130. For example, the LIDAR device 110 may be configured to determine a distance between a location of the LIDAR device 110 or another location relative to the LIDAR device 110 and the LIDAR target 130. The determination may be based on a time of flight analysis using an incident light beam 140 emitted from the LIDAR device 110 and a retro-reflected light beam 150 reflected by the retro-reflective material 120. The light beam 140 may correspond to visible light, infrared (IR) light, light from another portion of the electromagnetic spectrum, or any combination thereof. Although not illustrated in FIG. 1, it should be understood that the LIDAR device 110 may include an electromagnetic source and an electromagnetic detector. The incident light beam 140 may be emitted by the electromagnetic source and the retro-reflected light beam 150 may be detected by the electromagnetic detector.

The retro-reflective material 120 may be in contact with the LIDAR target 130. For example, the retro-reflective material 120 may include a retro-reflective dust configured to be dusted onto the LIDAR target 130 and to eventually be dusted off of the LIDAR target 130 over a period of time. Alternatively or in addition, the retro-reflective material 130 may include a retro-reflective paint, a retro-reflective coating, a retro-reflective tape, a retro-reflective cloth, a retro-reflective surface finish, or a combination thereof. The retro-reflective material 120 is further described with reference to FIGS. 2-5.

The LIDAR target 130 may include any object, surface, or person that a user of the LIDAR device 110 may desire to track or to determine a distance thereto. For example, the LIDAR target 130 may include a portion or surface of a construction site or mine, a train, a ship, a boat, an air vehicle, a perimeter of a high value facility, a portion of a spacecraft, a portion of a road, etc.

During operation, a user of the system 100 may place the retro-reflective material 120 in contact with the LIDAR target 130. For example, the retro-reflective material 120 may be dusted onto the LIDAR target 130. As another example, the retro-reflective material 120 may be painted onto, adhered to, or wrapped around the LIDAR target 130. After the retro-reflective material 120 is placed in contact with the LIDAR target 130, the LIDAR device 110 may emit the incident light beam 140 and direct the incident light beam 140 to the LIDAR target 130. The incident light beam 140 may be reflected by the retro-reflective material 120 back to the LIDAR device 110 as the retro-reflected light beam 150. The retro-reflected light beam 150 may then be detected by the LIDAR device 110. The LIDAR device 110 may determine a distance to the LIDAR target 130 using a time of flight analysis based on the initial light beam 140 and the retro-reflected light beam 150.

A benefit of the system 100 including the retro-reflective material 120 is that a range of the LIDAR device 110 may be increased as compared to systems that do not include the retro-reflective material 120. For example, the retro-reflected light beam 150 may be subject to less scattering as compared to systems that do not use the retro-reflective material 120. As another example, the LIDAR device 110 may be able to increase an amount of time during which it searches for the retro-reflected light beam 150 as compared to systems that do not use the retro-reflective material. This is because the retro-reflected light beam 150 is easily distinguishable from stray light beams thereby causing less concern that the stray light beams will interfere with the time of flight measurement. Other advantages and benefits of the system 100 will be apparent to persons of ordinary skill in the relevant art having the benefit of this disclosure.

Figure 2:
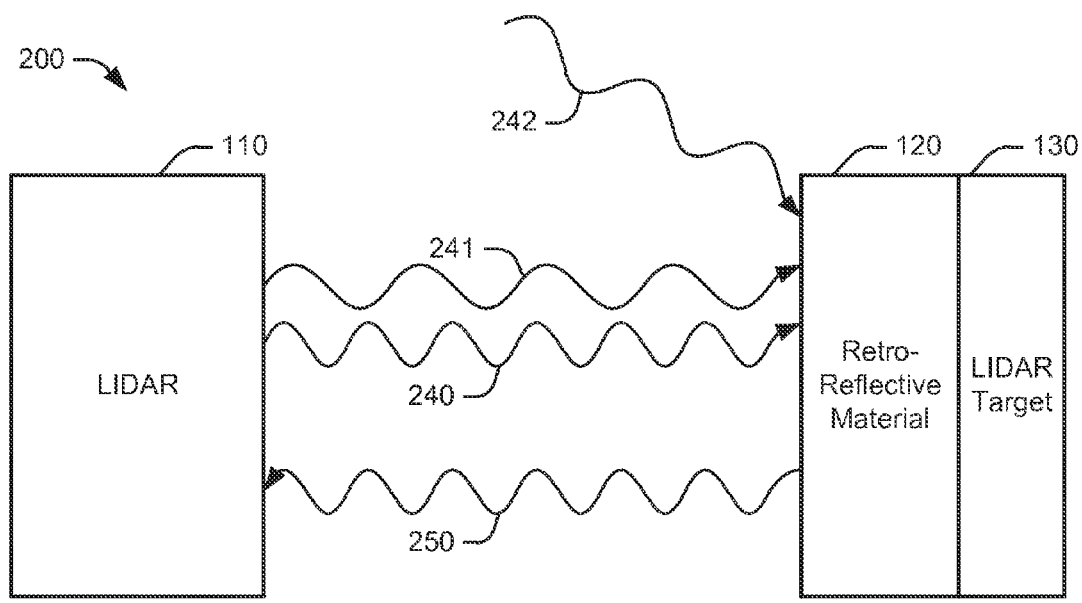
FIG. 2 illustrates an embodiment of a range enhanced LIDAR system.

Referring to FIG. 2, an embodiment of a range enhanced LIDAR system is depicted and generally designated 200. The system 200 may include the LIDAR device 110, the retro-reflective material 120, and the LIDAR target 130. Light emitted from the LIDAR device 110 may include a first incident light beam 240 and a second incident light beam 241. The first incident light beam 240 may correspond to a first wavelength range as indicated by the sinusoidal shape of the first incident light beam 240. The second incident light beam 241 may correspond to a second wavelength range as indicated by the sinusoidal shape of the second incident light beam 241. The second wavelength range may be different than the first wavelength range. Although FIG. 2 depicts the first light beam 240 and the second light beam 241 as distinct from each other, in other embodiments, both the first light beam 240 and the second light beam 241 may be portions of a single light beam. For example, the light beam 240 may be a first portion (i.e., within a first portion of the electromagnetic spectrum) of the light beam 140 and the second light beam 241 may be a second portion of the light beam 140.

The retro-reflective material 120 may receive the first light beam 240 and the second light beam 241. The retro-reflective material 120 may further receive an additional light beam 242 from another source. For example, the additional light beam 242 may be received from a source independent of the LIDAR device 110. The additional light beam 242 may correspond to the second wavelength range or may correspond to a third wavelength range distinct from the first and second wavelength ranges.

The retro-reflective material 120 may be retro-reflective of light within the first wavelength range and may be non-retro-reflective of light within the second wavelength range, the third wavelength range, or both. In an embodiment, the first wavelength range includes infrared light and the second wavelength range and/or the third wavelength range includes visible light. Hence, the retro-reflective material 120 may be retro-reflective of infrared light and may be non-retro-reflective of visible light. In an embodiment, the first wavelength range includes a first range of infrared light and the second wavelength range includes a second range of infrared light. As depicted in FIG. 2, the retro-reflective material 120 may retro-reflect the first light beam 240 as a retro-reflected light beam 250. The reflected light beam 250 may then be received at the LIDAR device 110. The second light beam 241 and the third light beam 242 may be scattered and/or attenuated upon contact with the retro-reflective material 120.

A benefit associated with the retro-reflective material 120 being retro-reflective of a first wavelength range and being non-retro-reflective of a second wavelength range is that the range enhanced LIDAR system 200 may be used in a covert manner. That is to say that a person viewing the LIDAR target 130 using visible light may not detect that the LIDAR target 130 has any retro-reflective property. Other advantages and benefits of the retro-reflective material 120 being retro-reflective of light within a first wavelength range and being non-retro-reflective of light within a second wavelength range will be apparent to persons of ordinary skill in the relevant art having the benefit of this disclosure.

Figure 3:
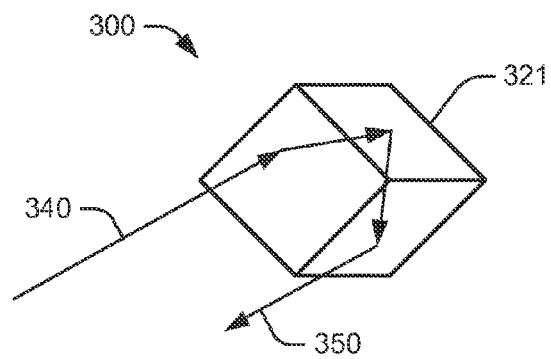
FIG. 3 illustrates an embodiment of a retro-reflective structure.

Referring to FIG. 3, an embodiment of a retro-reflective structure is depicted and generally designated 300. The retro-reflective structure 300 may correspond to the retro-reflective material 120 of FIGS. 1 and 2. As depicted in FIG. 3, the retro-reflective structure 300 may include a corner cube 321. The corner cube 321 may receive an incident light beam 340. The incident light beam 340 may be reflected off of one or more surfaces of the corner cube 321. For example, as depicted in FIG. 3, the incident light beam 340 may reflect off of three surfaces of the corner cube 321 resulting in a retro-reflected light beam 350. The retro-reflected light beam 350 may be substantially parallel to yet propagating in an opposite direction of the incident light beam 340. As used herein, substantially parallel means that the retro-reflected light beam 350 is closer to being parallel to the incident light beam 340 than to being perpendicular. A divergence angle of the retro-reflected light beam 350 may be substantially equal to a divergence angle of the incident light beam 340. As used herein, to be substantially equal means to be equal allowing for manufacturing variances of the retro-reflected structure and/or variances due to common environmental factors such as temperature, structural deformation, etc.

Figure 4:
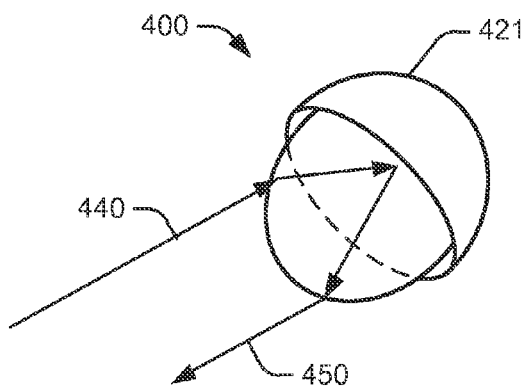
FIG. 4 illustrates an embodiment of a retro-reflective structure.

Referring to FIG. 4, an embodiment of a retro-reflective structure 400 is depicted and generally designated 400. The retro-reflective 400 may include a retro-reflective ball 421. The retro-reflective ball 421 may receive an incident light beam 440. The incident light beam 440 may be refracted and reflected by the retro-reflective ball 421 to generate a retro-reflected light beam 450. The retro-reflected light beam 450 may be substantially parallel to and propagate in an opposite direction of the incident light beam 440.

Figure 5:
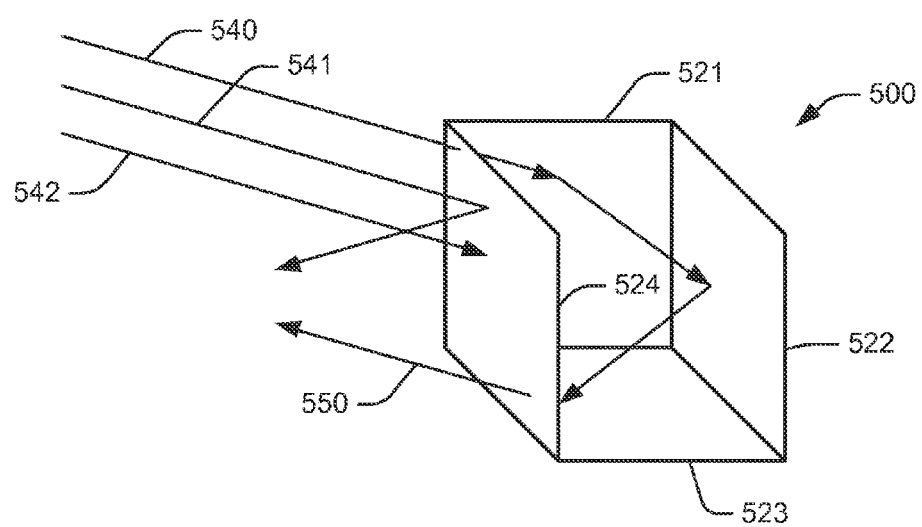
FIG. 5 illustrates an embodiment of a retro-reflective filter structure.

Referring to FIG. 5, an embodiment of a retro-reflective filter structure is depicted and generally designated 500. The retro-reflective filter structure 500 may include surfaces 521-523. The retro-reflective filter structure 500 may further include a filter 524. Although FIG. 5 depicts the retro-reflective filter structure 500 as including a corner cube structure (e.g., the surfaces 521-523), in other embodiments, the retro-reflective filter structure 500 may include a retro-reflective ball (e.g., the retro-reflective ball 421).

During operation, the retro-reflective structure 500 may receive multiple incident light beams 540-542. One or more of the multiple incident light beams 540-542 may correspond to one or more of the light beams 240-242 of FIG. 2. For example, a first incident light beam 540 may correspond to the incident light beam 240. Further, a second incident light beam 541 and a third incident light beam 542 may correspond to one or more of the incident light beams 241, 242 of FIG. 2.

The retro-reflective structure 500 may receive the first incident light beam 540 at the filter 524. The first incident light beam 540 may correspond to a first wavelength. The filter 524 may substantially pass the first incident light beam 540 therethrough. As used herein, to substantially pass the first incident light beam 540 means to attenuate the first incident light 540 beam by no more than 3 decibels (i.e., a power of the first incident light beam 540 after traversing the filter is greater than −3 dB times the power of the first incident light beam 540 before traversing the filter). After passing through the filter 524, the first incident light beam 540 may be reflected off of a first surface 521, a second surface 522, and a third surface 523 of the retro-reflective structure 500. The first light beam 540 may then be retro-reflected from the retro-reflective structure 500 as a retro-reflected light beam 550. The incident light beams 541, 542 may be filtered out by the filter 524 and may therefore not be retro-reflected by the retro-reflective structure 500. For example, the second incident light beam 541 may be reflected and/or scattered by the filter 524 in a non-retro-reflective manner. As another example, the third incident light beam 542 may be substantially blocked by the filter. As used herein, substantially blocking the third incident light beam 542 means attenuating the third incident light beam by more than 3 decibels (i.e., a power of the third incident light beam 542 after traversing the filter is less than −3 dB times the power of the third incident light beam 540 before traversing the filter).

Although FIG. 5 depicts the filter 524 as a plane, in other embodiments the filter 524 may be formed as a volume. For example, the retro-reflective filtering structure 500 may form a cube and the filter 524 may be formed by a material that fills the cube. Further, as explained herein, although FIG. 5 depicts the retro-reflective structure 500 as including a corner cube, the retro-reflective structure 500 may include a retro-reflective ball, such as the retro-reflective ball 421 of FIG. 4. In that case, the retro-reflective ball 421 may be filled with a filter material similar to the filter 524 such that the retro-reflective ball 421 filters out light beams that do not correspond to the first wavelength.

A benefit associated with the retro-reflective filter structure 500 is that the retro-reflective structure 500 may retro-reflect a light beam corresponding to a first wavelength and may not retro-reflect light beams corresponding to a second wavelength. Thus, the retro-reflective structure 500 may be retro-reflective of light beams corresponding to the first wavelength range and may be non-retro-reflective of light beams corresponding to the second wavelength range. Additional advantages and benefits of the retro-reflective filter structure 500 will be apparent to persons of ordinary skill in the relevant art having the benefit of this disclosure.

Figure 6:
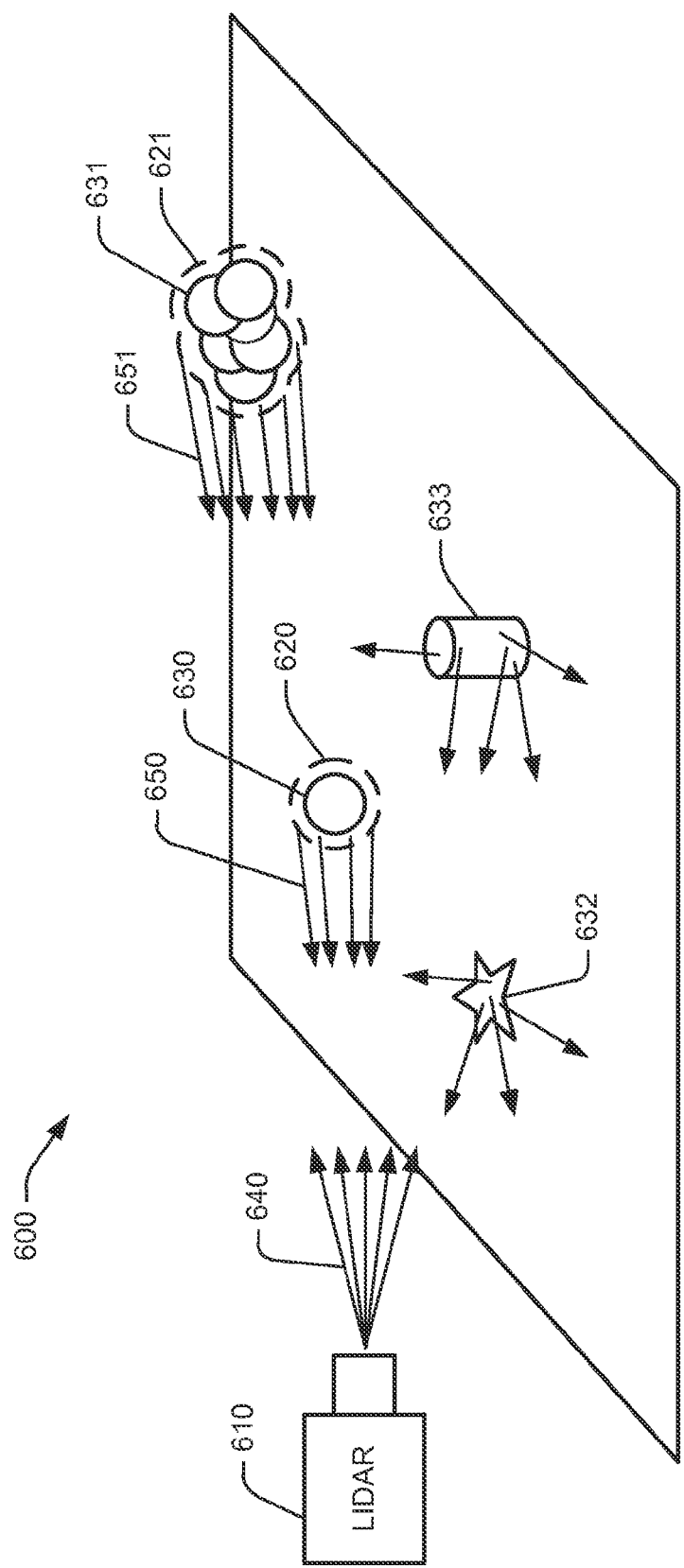
FIG. 6 illustrates an embodiment of a range enhanced LIDAR system.

Referring to FIG. 6, an embodiment of a range enhanced LIDAR system is depicted and generally designated 600. The system 600 may include a LIDAR device 610, a first LIDAR target 630, a second LIDAR target 631, a third LIDAR target 632, and a fourth LIDAR target 633. The first LIDAR target 630 and the second LIDAR target 631 may be coated by a first retro-reflective material 620 and a second retro-reflective material 621, respectively.

During operation, the LIDAR device 610 may emit a plurality of incident light beams 640. The first LIDAR target 630 may retro-reflect the plurality of light beam 640 toward the LIDAR device 610 as a plurality of retro-reflected light beams 650. The plurality of retro-reflected light beams 650 may be generated due to the retro-reflective material 620 coating the LIDAR target 630. Similarly, the LIDAR target 631 may reflect the plurality of light beams 640 as retro-reflected light beams 651 due to the retro-reflective coating 621. In contrast to the first LIDAR target 630 and the second LIDAR target 631, the third LIDAR target 632 and the fourth LIDAR target 633 may scatter the light beams 640.

Because the first and second LIDAR targets 630, 631 retro-reflect the plurality of light beams 640 back toward the LIDAR device 610 as retro-reflected light beams 650, 651, a range of the LIDAR device 610 may be increased with respect to the first and second LIDAR targets 630, 631 as compared to the third and fourth LIDAR targets 632, 633. For example, the LIDAR device 610 may be able to determine a distance between the LIDAR device 610 and the third and fourth LIDAR targets 632, 633 when the third and fourth LIDAR targets 632, 633 are within 20 feet of the LIDAR device 610. In contrast, the LIDAR device 610 may be able to determine a distance to the first and second LIDAR targets 630, 631 when the first and second LIDAR targets 630, 631 are further than 20 feet from the LIDAR device 610.

A benefit of the range enhanced LIDAR system 600 is that the system 600 may be applied in cases where particular LIDAR targets may be at long distances from the LIDAR device 610. For example, the system 600 may be applied to construction mapping, mine mapping, train switching station monitoring, harbor security monitoring, three dimensional airport mapping/monitoring, perimeter surveillance of high value facilities, space craft docking mechanisms, road mapping, and/or air refueling assistance. Other advantages, benefits, and applications of the system 600 will be apparent to persons of ordinary skill in the relevant art having the benefit of this disclosure.

Figure 7:
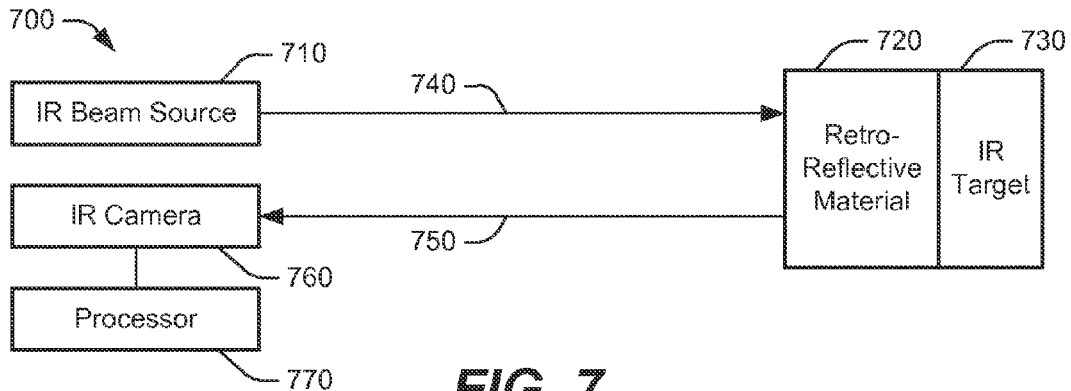
FIG. 7 illustrates an embodiment of an infrared (IR) camera system.

Referring to FIG. 7, an embodiment of an IR camera system is depicted and generally designated 700. The IR camera system 700 may include an IR beam source 710, a retro-reflective material 720, an IR target 730, an IR camera 760, and a processor 770. The IR beam source 710, IR camera 760, and processor 770 may be integrated into a single device or the IR camera 760 may include processor 770 as would be appreciated by one of ordinary skill in the art having the benefit of this disclosure. The retro-reflective material 720 may be in contact with the IR target 730. The IR beam source may include any source of IR light. The IR camera 760 may include any type of camera configured to detect light within the IR wavelength ranges. The retro-reflective material 720 may correspond to the retro-reflective material 120.

During operation, the IR beam source may transmit an incident light beam 740 toward the IR target 730. The incident light beam 740 may be received at the retro-reflective material 720 and retro-reflected as a retro-reflected light beam 750 to the IR camera 760. Both the incident light beam 740 and the retro-reflected light beam 750 may correspond to wavelengths within the IR portion of the electromagnetic spectrum. The processor 770 may receive an IR image from the IR camera 760. Based on the IR image the processor 770 may detect and/or track the IR target 730.

Tracking the IR target 730 may include monitoring a position of the IR target 730 within a two dimensional plane.

A benefit associated with the system 700 is that the IR target 730 may be detected and/or tracked from greater distances as compared to systems that do not include the retro-reflective material 720. Other advantages and benefits of the system 700 will be apparent to persons of ordinary skill in the relevant art having the benefit of this disclosure.

Figure 8:
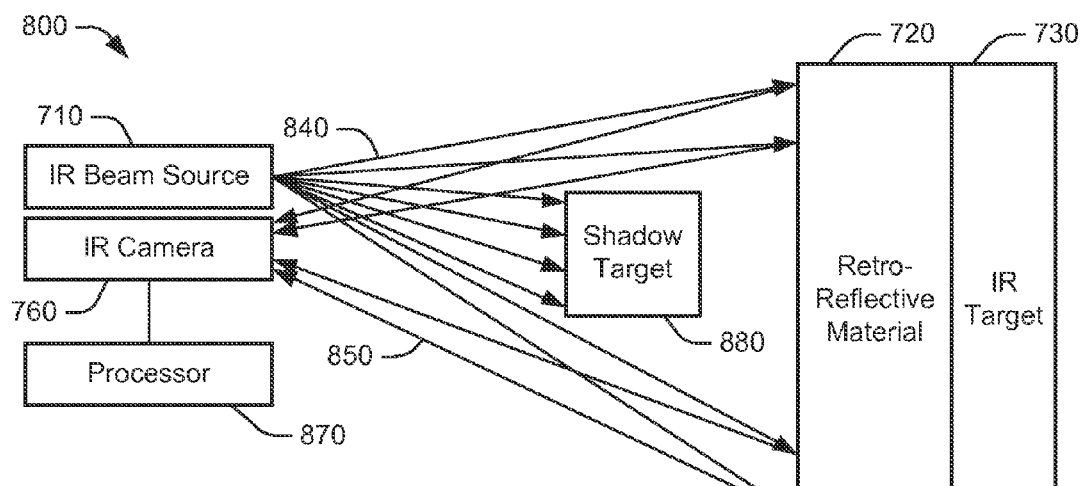
FIG. 8 illustrates an embodiment of an IR camera system.

Referring to FIG. 8, an embodiment of an infrared camera system is depicted and generally designated 800. The system 800 may include the IR beam source 710, the retro-reflective material 720, the IR target 730, the IR camera 760, and a processor 870.

During operation, the IR beam source 710 may transmit multiple incident IR beams 840 toward the IR target 730. The incident IR beams 840 may be retro-reflected by the retro-reflective material 720 as retro-reflected IR beams 850. Although FIG. 8 depicts the retro-reflected IR beams 850 as being at retro-reflected at angles different than the incident IR beams 840, the angles are greatly exaggerated for simplicity of illustration. To illustrate, the IR beam source 710 and the IR camera 760 may be co-located at a single location, and the retro-reflected IR beams 850 may be retro-reflected back to the single location.

In an embodiment, a shadow target 880 may be positioned between the IR camera 760 and the IR target 730. While the IR target 730 may be in contact with or coated with the retro-reflective material 720, the shadow target 880 may not include any retro-reflective material. Therefore, the shadow target 880 may not be retro-reflective. The shadow target 880 may cast a shadow within the retro-reflected IR beams 850 thereby producing a shadow from the view of the IR camera 860. For example, because the shadow target 880 is not coated with a retro-reflective material, the shadow target 880 may scatter and/or absorb the incident light beams 840 while light beams not absorbed by the shadow target 880 may be retro-reflected by the retro-reflective material 720 back to the IR camera 760.

The processor 870 may be configured to receive an IR image from the IR camera 760 and to detect and/or track the shadow target 880 positioned between the IR camera 760 and the IR target 730. To illustrate, the IR target 730 may include one or more surfaces such as a wall, the ground, or another surface coated with the retro-reflective material 720. The processor 870 may be configured to detect and/or track the shadow target 880 within a two dimensional plane comprising the surfaces of the IR target 730.

A benefit associated with the system 800 is that the shadow target 880 need not be in contact with a retro-reflective material. Hence, the shadow target 880 may be detected and/or tracked without requiring previous contact with the shadow target 880 by a user of the IR camera 760. Other advantages and benefits will be apparent to persons of ordinary skill in the relevant art having the benefit of this disclosure.

Figure 9:
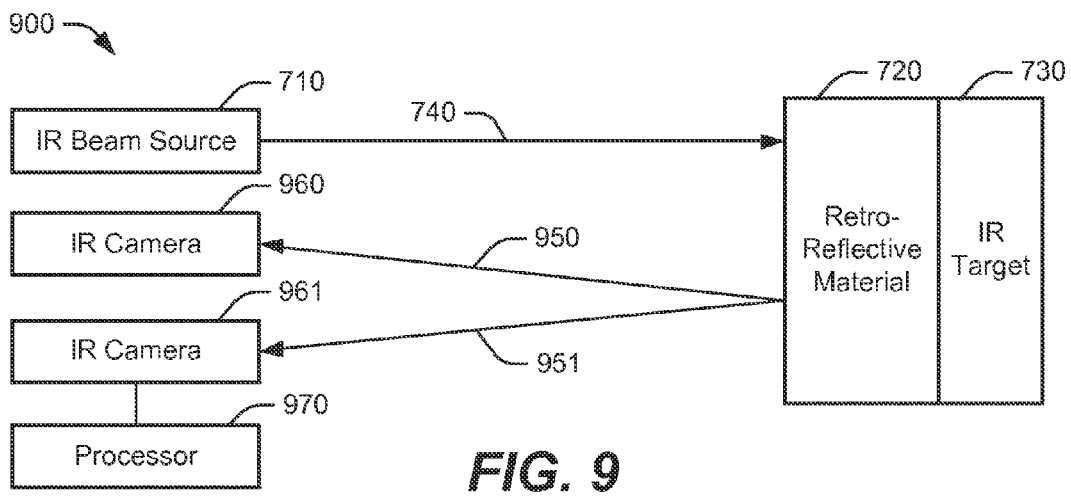
FIG. 9 illustrates an embodiment of an IR camera system.

Referring to FIG. 9, an embodiment of an IR camera system is depicted and generally designated 900. The system 900 includes the IR beam source 710, the retro-reflective material 720, and the IR target 730. The system 900 further includes a first IR camera 960, a second IR camera 961, and a processor 970.

During operation, the retro-reflective material 720 may receive the incident light beam 740 and reflect the incident light beam 740 as a first retro-reflected light beam 950 and a second retro-reflected light beam 951. The first retro-reflected light beam 950 may be received by the first IR camera 960 and the second retro-reflected light beam 951 may be received by the second IR camera 961. The processor 970 may be configured to receive a first IR image from the first IR camera 960 and a second IR image from the second IR camera 961. The processor may be further configured to calculate parallax measurements based on information received from the first IR camera 960 and from the second IR camera 961. Based on the parallax measurements, the processor 970 may calculate a distance from a fixed point to the IR target 730. For example, the fixed point may include a location of the IR beam source 710, the IR camera 960, the IR camera 961, the processor 970, another and/or location relative to the system 900. In an embodiment, the IR beam source 710, the first IR camera 960, the second IR camera 961 and the processor 970 are at a same location.

A benefit of the system 900 is that the IR target 730 may be detected and/or tracked in a two dimensional plane using light from the IR wavelength range while at the same time a distance to the IR target may be determined. Hence, the IR target 730 may be detected and/or tracked in three dimensions. Other advantages and benefits of the system 900 will be apparent to persons of ordinary skill in the relevant art having the benefit of this disclosure.

Figure 10:
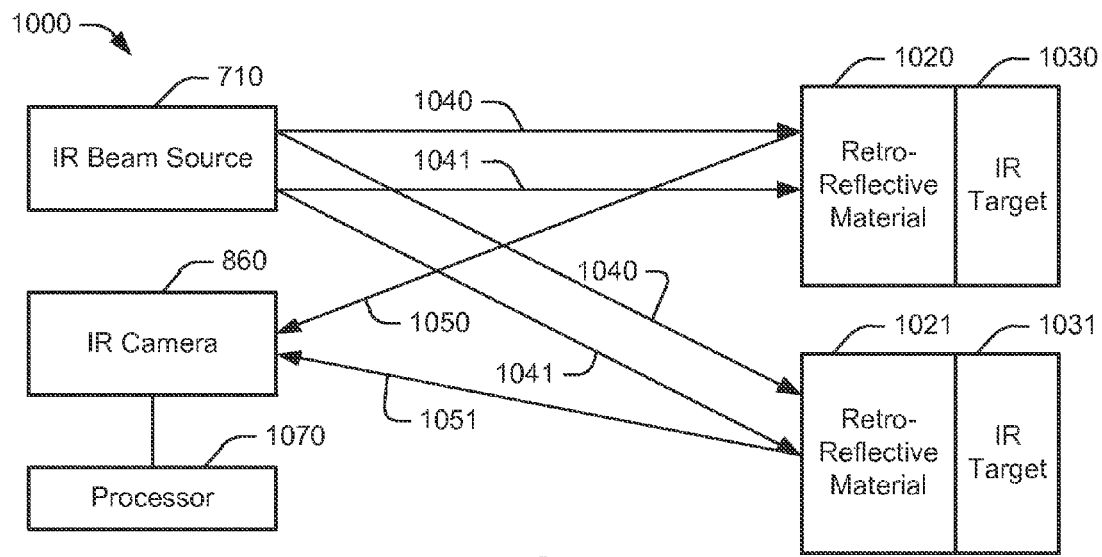
FIG. 10 illustrates an embodiment of an IR camera system.

Referring to FIG. 10, an embodiment of an IR camera system is depicted and generally designated 1000. The IR system 1000 may include the IR beam source 710 and the IR camera 860. The IR camera system 860 may further include a first retro-reflective material 1020, a first IR target 1030, a second retro-reflective material 1021, a second IR target 1031, and a processor 1070.

During operation, the IR beam source 710 may emit a first incident IR beam 1040 and a second incident IR beam 1041. The first incident IR beam 1040 may be received at the first retro-reflective material 1020 and at the second retro-reflective material 1021. Similarly, the second incident IR beam 1041 may be received at the first retro-reflective material 1020 and at the second retro-reflective material 1021. The first retro-reflective material 1020 may be configured to retro-reflect the first incident IR beam 1040 but not retro-reflect the second incident IR beam 1041. For example, the first IR beam 1040 may correspond to a first wavelength range and the second IR beam 1041 may correspond to a second wavelength range. The first retro-reflective material 1020 may be retro-reflective of light within the first wavelength range, but not within the second wavelength range. Similarly, the second retro-reflective material 1021 may be retro-reflective of the second incident IR beam 1041 but not the first incident IR beam 1040. The retro-reflective material 1020 may generate a first retro-reflected IR beam 1050 while the retro-reflective material 1021 generates a second retro-reflected IR beam 1051. The first retro-reflected IR beam 1050 may correspond to the first incident IR beam 1040 and the second retro-reflected IR beam 1051 may correspond to the second incident IR beam 1041.

The IR camera 860 may receive the first retro-reflected IR beam 1050 and the second retro-reflected IR beam 1051. For example, the first retro-reflected IR beam 1050 may be received at the IR camera 760 from the retro-reflective material 1020. The second retro-reflected IR beam 1050 may be received at the IR camera 760 from the retro-reflective material 1021. The processor 1070 may be configured to receive an image from the IR camera 860. Based on the image, the processor 1070 may detect and/or track the IR target 1030 and the IR target 1031. Further, based on the first retro-reflected IR beam 1050 and the second retro-reflected IR beam 1051, the processor may distinguish the first IR target 1030 from the second IR target 1031 based on the wavelength of the received reflected IR beams 750, 751.

A benefit of the system 1000 is that multiple targets may be marked and distinguished from each other while being tracked in the IR wavelength range. Other advantages and benefits may be apparent to persons of ordinary skill in the relevant art having the benefit of this disclosure.

Figure 11:
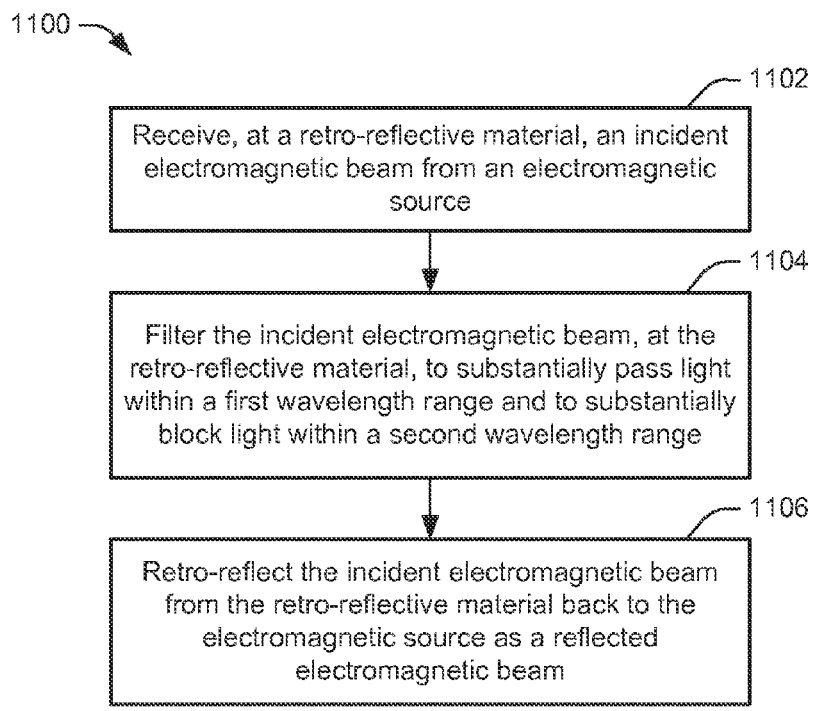
FIG. 11 illustrates an embodiment of a method of range enhancement.

Referring to FIG. 11, an embodiment of a method of range enhancement is depicted and generally designated 1100. The method 1100 may include receiving, at a retro-reflective material, an incident electromagnetic beam from an electromagnetic source, at 1102. For example, the retro-reflective material 120 may receive the light beam 140 from the LIDAR device 110. As another example, the retro-reflective material 720 may receive the light beam 740 from the IR beam source 710.

The method 1100 may further include filtering the incident electromagnetic beam, at the retro-reflective material, to substantially pass light within a first wavelength range and to substantially block light within a second wavelength range, at 1104. For example, the retro-reflective material 120 may receive the first incident light beam 240 corresponding to a first wavelength range and the second incident light beam 241 corresponding to a second wavelength range. The retro-reflective material 120 may substantially pass the first incident light beam 240 corresponding to the first wavelength range and may substantially block the second incident light beam 241 corresponding to the second wavelength range. As another example, the retro-reflective material 1020 may substantially pass the first incident IR beam 1040 and substantially block the second incident IR beam 1041, while the retro-reflective material 1021 may substantially pass the second incident IR beam 1041 and substantially block the first incident IR beam 1040.

The method 1100 may also include retro-reflecting the incident electromagnetic beam from the retro-reflective material back to the electromagnetic source as a reflected electromagnetic beam, at 1106. For example, the retro-reflective material 120 may reflect the incident light beam 140 back to the LIDAR device 110 as a retro-reflected light beam 150. As another example, the retro-reflective material 720 may reflect the incident IR beam 740 back to the IR camera 750 (the IR camera 750 being co-located with the IR beam source 710).

The method 1100 may enable a LIDAR system and/or an IR camera system to increase a range associated with a LIDAR device and/or an IR camera. By increasing the range of the LIDAR device and/or IR camera, the method 1100 may be applied in cases where systems that do not include a retro-reflective material would be inoperable, such as when a target to be detected or tracked is far from the electromagnetic source and/or detector.

Although various embodiments have been shown and described, the present disclosure is not so limited and will be understood to include all such modifications and variations are would be apparent to one skilled in the art.

What is claimed is:

1. A system comprising:
a light detection and ranging (LIDAR) device;
a first LIDAR target, wherein the LIDAR device is configured to direct a light beam at the first LIDAR target;
a first retro-reflective material in contact with the first LIDAR target;
a second LIDAR target, wherein the LIDAR device is further configured to direct the light beam at the second LIDAR target; and
a second retro-reflective material in contact with the second LIDAR target, wherein the first retro-reflective material is retro-reflective of light within a first wavelength range and is non-retro-reflective of light within a second wavelength range, and wherein the second retro-reflective material is non-retro-reflective of light within the first wavelength range and is retro-reflective of light within the second wavelength range.

2. The system of claim 1, wherein the first wavelength range includes infrared light and the second wavelength range includes visible light.

3. The system of claim 1, wherein the first wavelength range includes a first infrared range and the second wavelength range includes a second infrared range.

4. The system of claim 1, wherein the first retro-reflective material, the second retro-reflective material, or both comprise a retro-reflective dust configured to be dusted off of the LIDAR target over a period of time.

5. The system of claim 1, wherein the first retro-reflective material, the second retro-reflective material, or both comprise a retro-reflective paint, a retro-reflective coating, a retro-reflective tape, a retro-reflective cloth, a retro-reflective surface finish, or a combination thereof.

6. The system of claim 1, wherein the first retro-reflective material, the second retro-reflective material, or both include a retro-reflective structure configured to receive an incident electromagnetic beam from the LIDAR device and to reflect the incident electromagnetic beam back to the LIDAR device as a reflected electromagnetic beam.

7. The system of claim 6, wherein a divergence angle of the reflected electromagnetic beam is substantially equal to a divergence angle of the incident electromagnetic beam.

8. The system of claim 6, wherein the retro-reflective structure includes a corner cube or a retro-reflecting ball.

9. The system of claim 6, wherein the retro-reflective structure further includes a filter that substantially passes light within the first wavelength range and substantially blocks light within the second wavelength range.

10. The system of claim 1, wherein a distance between the LIDAR device and the first LIDAR target, the second LIDAR target, or both is greater than 20 feet.

11. A system comprising:
an infrared (IR) source;
an IR camera;
an IR target comprising one or more surfaces; and
a retro-reflective material in contact with the IR target; and
a processor configured to receive an IR image from the IR camera and to detect and track a shadow target positioned between the IR camera and the one or more surfaces.

12. The system of claim 11, wherein the processor is further configured to receive an IR image from the IR camera and to detect and track the IR target based on the IR image.

13. The system of claim 11, further comprising a second IR camera and a processor configured to:
calculate parallax measurements based on information received from the IR camera and from the second IR camera; and
calculate a distance from a fixed point to the IR target based on the parallax measurements.

14. The system of claim 11, further comprising:
a second IR target; and
a second retro-reflective material in contact with the second IR target,
wherein the retro-reflective material is retro-reflective of light within a first wavelength range and is non-retro-reflective of light within a second wavelength range, and wherein the second retro-reflective material is non-retro-reflective of light within the first wavelength range and is retro-reflective of light within the second wavelength range.

15. The system of claim 11, wherein tracking the shadow target comprises tracking the shadow target within a two dimensional plane.

16. A method comprising:
receiving, at a retro-reflective material, an incident electromagnetic beam from an electromagnetic source;
filtering the incident electromagnetic beam, at the retro-reflective material, to substantially pass light within a first wavelength range and to substantially block light within a second wavelength range; and
retro-reflecting the incident electromagnetic beam from the retro-reflective material back to the electromagnetic source as a reflected electromagnetic beam;
receiving the retro-reflected electromagnetic beam at a first IR camera and at a second IR camera;
calculating parallax measurements based on the retro-reflected electromagnetic beam received at the first IR camera and at the second IR camera; and
calculating a distance from a fixed point to an IR target based on the parallax measurements.

17. The method of claim 16, further comprising lining a surface of the IR target with the retro-reflective material.

18. The method of claim 16, further comprising receiving the reflected electromagnetic beam at the electromagnetic source and determining a distance between the electromagnetic source and the IR target based on a measured time of flight of the incident electromagnetic beam and the reflected electromagnetic beam.

19. The method of claim 16, further comprising receiving the reflected electromagnetic beam at the electromagnetic source and tracking the IR target in two dimensions via the reflected electromagnetic beam.

* * * * *